April 30, 1968 F. C. DOUGHTY ET AL 3,381,281

THIN FILM MAGNETIC STORAGE APPARATUS, METHOD AND ARTICLE OF MANUFACTURE

Filed June 8, 1964 8 Sheets-Sheet 1

INVENTORS.
FREDERIC C. DOUGHTY
PALMER A. HOFFMAN
BY Carl Fissell Jr.
AGENT

April 30, 1968 F. C. DOUGHTY ET AL 3,381,281
THIN FILM MAGNETIC STORAGE APPARATUS, METHOD
AND ARTICLE OF MANUFACTURE
Filed June 8, 1964 8 Sheets-Sheet 2

INVENTORS.
FREDERIC C. DOUGHTY
PALMER A. HOFFMAN
BY
Carl Fissell Jr.
AGENT

INVENTORS.
FREDERIC C. DOUGHTY
BY PALMER A. HOFFMAN

Carl Fissell Jr.
AGENT

INVENTORS.
FREDERIC C. DOUGHTY
PALMER A. HOFFMAN
BY Carl Fissell Jr.
AGENT

INVENTORS.
FREDERIC C. DOUGHTY
PALMER A. HOFFMAN
BY
Carl Fissell Jr.
AGENT

INVENTORS.
FREDERIC C. DOUGHTY
PALMER A. HOFFMAN
BY
Carl Fissell Jr.
AGENT

INVENTORS.
FREDERIC C. DOUGHTY
PALMER A. HOFFMAN
BY Carl Fissell Jr.
AGENT

BY

INVENTORS.
FREDERIC C. DOUGHTY
PALMER A. HOFFMAN

Carl Fissell Jr.
AGENT 3,381,281

THIN FILM MAGNETIC STORAGE APPARATUS, METHOD AND ARTICLE OF MANUFACTURE

Frederic C. Doughty, Tredyffrin Township, and Palmer A. Hoffman, Ridley Park, Pa., assignors to Burroughs Corporation, Detroit, Mich., a corporation of Michigan Filed June 8, 1964, Ser. No. 373,396
14 Claims. (Cl. 340—174)

The present invention relates to magnetic memory storage apparatus and, more particularly, although not necessarily exclusively, to a method and apparatus for fabricating a magnetic thin film memory storage plane. With still more specificity, the invention has to do with a novel method of producing a thin film memory plane comprising a plurality of electrically insulating substrates bearing magnetizable thin films thereon, and to means for arranging the electrical conductors and associated magnetizable bits for energizing, storing and reading out information relative to such thin films in closely adjacent relationship while being electrically insulated away therefrom.

Until recently, the maximum frequency characteristics of ferrite cores have limited the speed of operational memory systems. Toroidal ferrite cores, while capable of operation at rates up to and including 500 kc., require excessive amounts of power at these and higher frequencies due to hysteresis losses. Attempts to obtain greater operating speeds by using smaller cores requiring less driving power have met with basic difficulties with respect to the practicability and cost of interwiring such small sized elements.

Thin film memory elements have planar geometry and are capable of operating at rates exceeding 10 mc./s. Such devices have the inherent ability to be produced in large quantities at a fraction of the cost of wired ferrite systems. Thin film magnetic memory planes offer additional advantages in that they accept greater drive tolerances than do ferrite cores. They yield bipolar outputs automatically and they can be driven by single polarity pulses for information entry and read-out.

Such films, which are generally deposited on an electrically insulating substrate, while under the influence of a magnetic field, show a preferred or "easy" direction of magnetization. All area magnetic domains lie parallel to the direction of this field, and a films' magnetic characteristics in the preferred direction shows a square hysteresis loop. Perpendicular to this easy direction, called the "hard" direction, the films, show a substantially linear loop. From these two characteristics, the wall coercive force in the easy direction $H_c$ and the rotational coercive force in the hard direction $H_k$ can be obtained.

The pjrinciples of magnetic memory storage operation are best explained by the discussion of a single magnetizable bit, e.g. rectangles 1/32" wide by 3/32" long disposed upon a glass substrate .050" thick. Three conductors are associated with each bit. The "word drive" conductor is parallel to the preferred direction and the "information" and "sense" conductors are parallel to the "hard" direction. The "information" conductor is split in order to reduce the mutual capacity between the information and the "sense" lines and so as to reduce eddy currents in the "information" conductors induced by the "word drive" current. Current in a word-conductor generates a transverse field. If this field exceeds the films' rotational coercive force $H_k$ plus the films' demagnetizing field in the "hard" direction, the films' magnetic dipoles rotate to the "hard" direction. This rotation induces "sense" signals of opposite polarities if the rotation originates from the "one" or the "zero" state.

In order to magnetize a film bit to a desired state, two fields, a transverse and a longitudinal field, perpendicular to each other, are applied. The resultant of these two fields rotates the magnetic dipoles to a biased state either toward the "one" or "zero" depending upon the direction of the longitudinal field (information field or bit field). Upon removal of the transverse field before the longitudinal field, the dipoles rotate to a rest position indicative of the desired state. Magnetic thin films are open loop devices, i.e. their flux lines return through an air path. Films are therefore susceptible to stray magnetic fields.

It is an important object of this invention to solve the foregoing and other associated problems in a new, novel and heretofore unknown manner.

Another object of the present invention is to provide a thin film memory plane having high packing density of magnetic thin film deposits so as to obtain a high speed low cost device.

It is another object of the present invention to provide a thin film memory plane having an obverse, reverse checker-board magnetizable bit pattern, wherein the thin film deposits of one surface are interleaved with those of the opposite surface thereof, thus increasing the overall packing density. Still another object of the present invention is to provide a novel method for packaging a relatively large number of magnetic thin film bearing substrates in a relatively small space.

Another object of the present invention is to provide a method for arranging the word lines for the thin film memory plane package relatively close to the magnetizable thin film deposits, thereby to reduce the word current necessary for proper operation of the device.

It is also an object of the present invention to provide a novel method of packaging a plurality of thin film memory plane substrates in a manner providing high signal to noise ratios and enabling intercoupling of one package with another and adjacent packaging without attended electrical interference from such packages.

In accordance with the foregoing objects and first briefly described herein, the present invention comprises thin film memory plane assembly including a plurality of magnetic thin film memory plane substrates wherein a thin stretched film or dielectric membrane carrying electrical conductors overlies the magnetizable bits of the thin film memory plane in a manner reducing the word current necessary for proper operation thereof, and wherein the magnetizable deposits or bits are provided on obverse and reverse sides of the supporting substrate in a checker-board pattern so that the magnetizable material on one side is effectively interleaved with the magnetizable material on the opposite side thereof, and wherein information, bit, sense, and word interconnecting lines are arranged in a manner providing a relatively thin package having extremely high packing density and being slidably, pluggably interconnectable with other associated electrical circuitry.

The foregoing and other objects. features and advantages of the invention will be apparent from the following more detailed description of the preferred embodiment of the invention as illustrated in the accompanying drawings, wherein.

Figure 1:
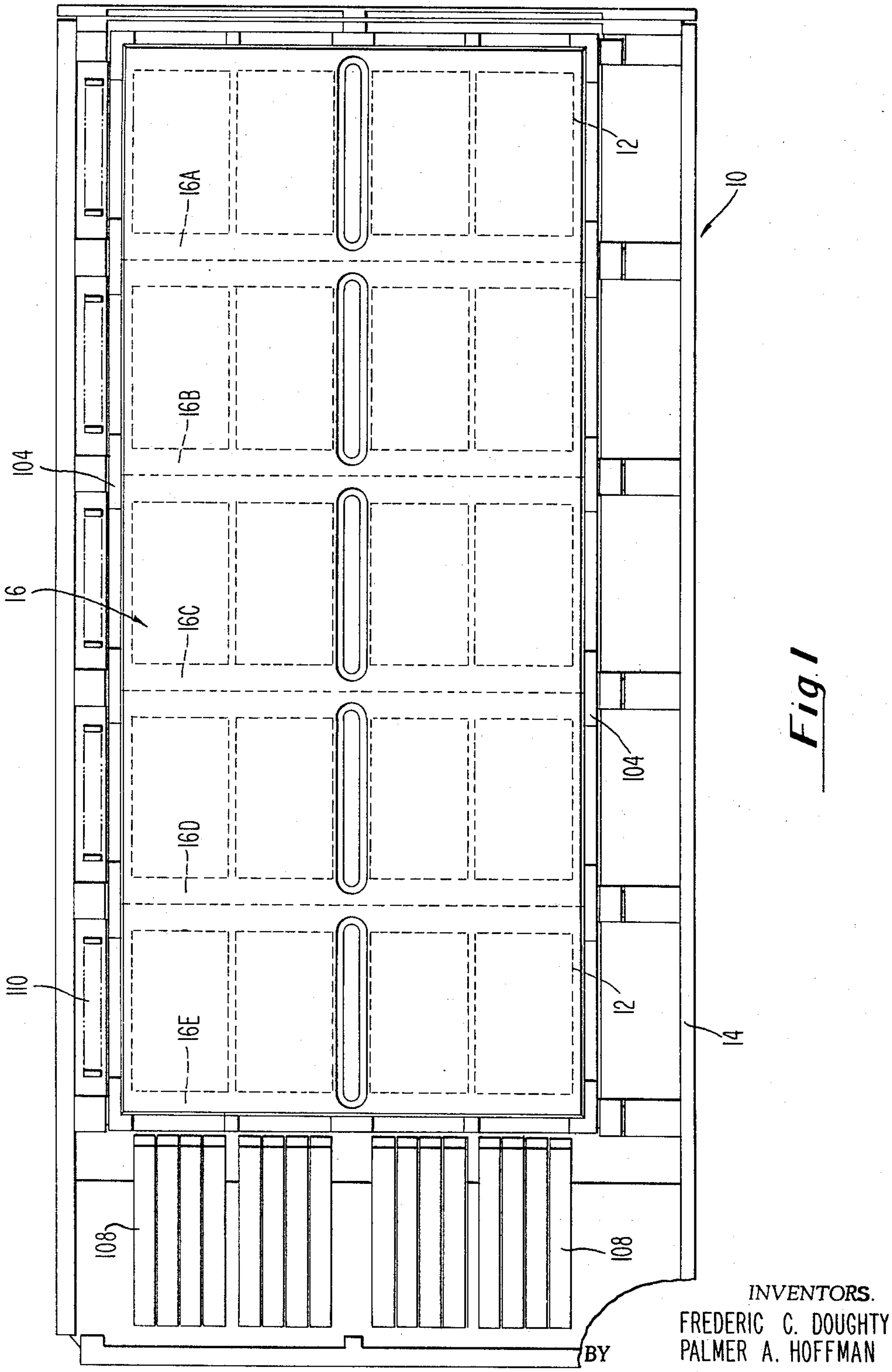
FIGURE 1 is a plan view of a complete thin film memory plane assembly according to the teaching of the present invention.

With known fabrication techniques for producing magnetizable thin film memory apparatus, the packing density of the magnetic thin films disposed on the electrically insulating substrate support is on the order of 200 magnetizable thin film bits per square inch. The field of deposits usually is arranged in ordered rows and columns with the rows 0.1" apart and the columns 0.05" apart. The magnetizable film material is deposited by vacuum deposition techniques and is usually 0.035" by 0.080". Reduction in deposit size e.g. to 0.020" x 0.080" would permit the thin film material to be arranged in 0.025" intervals along the rows. Such an arrangement would affectively reduce the space between adjacent deposits from approximately 0.015" to approximately 0.005". Such spacing, however, creates other problems in the etching steps as well as the possibility of magnetic interaction between adjacent spots.

These and other associated problems have been solved by the present invention in a new, novel and heretofore unknown manner by depositing thin film magnetizable material on both sides of a dielectric substrate support with 0.020" x 0.080" bits at 0.050" intervals with the fields (bits) on the opposite side of the substrate support staggered by 0.025". This arrangement permits the thin film bits to be arranged and disposed at 0.025" intervals e.g. in a checker-board type pattern. The closer spacing, thus produced by the foregoing arrangement, requires that the word line drive conductors and their support be brought relatively close to the thin film deposits.

In the known arrangement, heretofore in vogue, the electrical field generated by differential currents in the word line conductors passing over and under a column of bits is not totally confined to that column. Whereas the field between the conductors is on the order of oersteds, the undesired field exerted upon the adjacent column 0.05" away is 0.45 oersted. By changing the thin film spot spacing from 0.05" to 0.025" apart the undesired field strength at the adjacent columns increases to approximately 1.54 oersteds. The utilization of a very thin copper clad high dielectric material e.g. "Mylar," manufactured by the Du Pont Corp., Wilmington, Del., for the word drive conductor support enables the employment of the checker-board, obverse, reverse thin film bit arrangement as hereinafter described in detail. With this structural configuration and arrangement, the field spread out on a film spot 0.025" away along the row dimension can be shown to be approximately 0.45 to 0.46 oersted. Thus a two to one (2–1) increase in packing density can be achieved with this arrangement while the undesired field "spread out" remains substantially the same as before.

A thin film memory plane frame assembly 10 constructed in accordance with the teaching of the present inventive concepts is shown in the top plan view of FIGURE 1. In the particular embodiment therein depicted magnetizable thin film dielectric substrate supports 12 for example, twenty in this view, are employed and are arranged in a rectangular pattern and disposed on a slidably pluggable, demountable relatively rigid frame 14 which is adapted to be electrically and mechanically interconnected to other similar assemblies and associated electrical circuitry thereby to provide a multi-word, relatively high density, very high speed thin film computer memory.

FIGURES 2 through 21 inclusive of the drawings represent views diagrammatic and schematic-illustrative of the various steps in the fabrication method for constructing the memory plane of FIG. 1. Each of these steps will be described in more or less detail as the present description proceeds.

A memory plane 16, for purposes of convenience of assembly and wiring is fabricated in two complementery half portions, as will be described and identified hereinafter. The two halves are then joined together so as to provide the structure of FIG. 1. For ease in handling and also in order that errors in fabrication of one portion of the assembly will not deleteriously effect other similar portions of the memory plane 16, the plane is divided into five substantially identical unitary sub-assemblies the smaller rectangular dashed outlines identified hereinafter as 16A, 16B, 16C, 16D and 16E, respectively.

Figure 2:
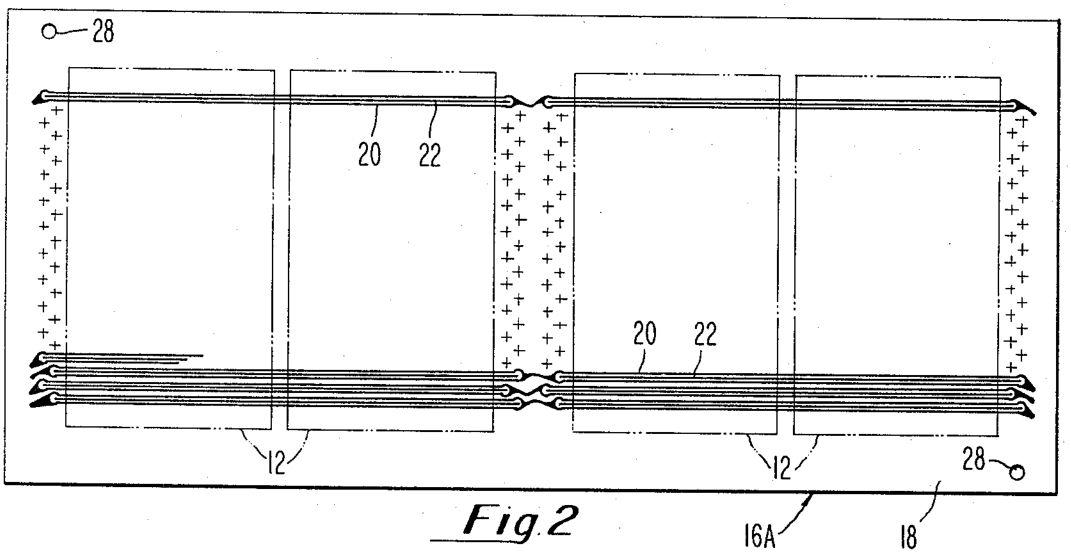
FIGURE 2 is a plan view of a sense and bit printed circuit board or card for the memory plane of FIGURE 1.

As seen more particularly in FIG. 2, each one of these sub-assemblies, 16A through 16E includes, among other things, a relatively thin, double side, copper clad, dielectric semi-rigid member 18, e.g. glass epoxy PC (printed circuit) board .016 of an inch thick. Sense and bit or information lines 20 and 22, respectively, are thereafter provided upon each PC board 18 as by etching techniques in a known manner thereby to provide a pattern of conductors on each board substantially identical to the patterns shown in FIGS. 2, 3, 6 and 7. Since the conductors 20 and 22 are adapted to lie closely adjacent and facing the magnetizable thin film material hereinafter identified; these sets of three conductors are disposed on one face 18A of each PC board 18 while the connecting and interconnecting terminal conductors 24 and the cross over connector conductors 26 are disposed on the opposite face 18B of each PC board 18.

Figure 8:
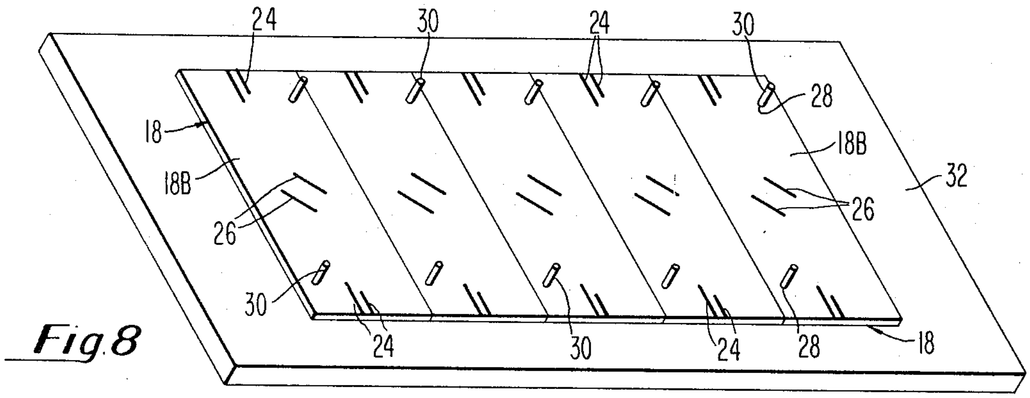
FIGURE 8 is an isometric view of a fixture on which the printed circuits of FIGURES 6 and 7 are disposed for further processing.
Figure 9:
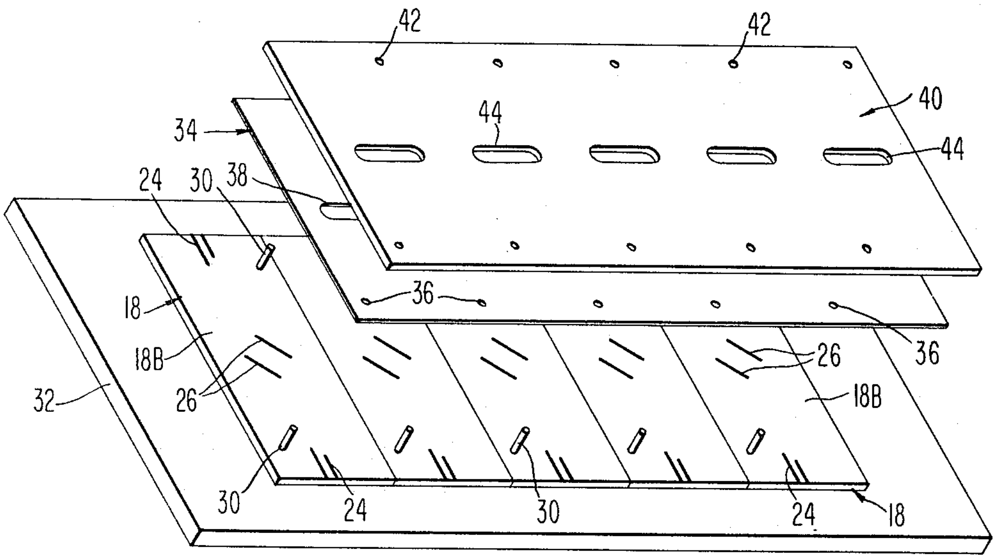
FIGURE 9 is an isometric view of the fixture of FIGURE 8 with the boards of FIGURE 2 thereon and including an adhesive sheet and an intermediate backing board disposed thereover.

The five PC boards are next provided with oppositely disposed alignment apertures 28 located at opposite diagonal corners thereof, for subsequent engagement with demountable, vertically projecting dowels 30 pluggably disposed on a jig board or fixture 32. The PC boards are then aligned on the jig 32 in side by side parallel abutting relationship as seen in FIG. 8 with the information-bit-sense lines faced downward. A sheet of dielectric material 34 having adhesive bonding material (not shown) on both sides thereof is next placed down over the PC boards 18 with the preformed openings 36 therein aligned with dowels 30 and with central access apertures 38 arranged over the conductors 26.

An intermediate backing or stiffening board 40 of slightly smaller dimension than the overall dimension of the five PC boards, as arranged together, is disposed over the adhesive sheet 34 with the perforations 42 and 44 of board 40 in register with the dowels 30 and the conductors 26. The board 40 is then pressed onto the adhesive to form the sub-assembly shown in FIGURE 10.

Figure 10:
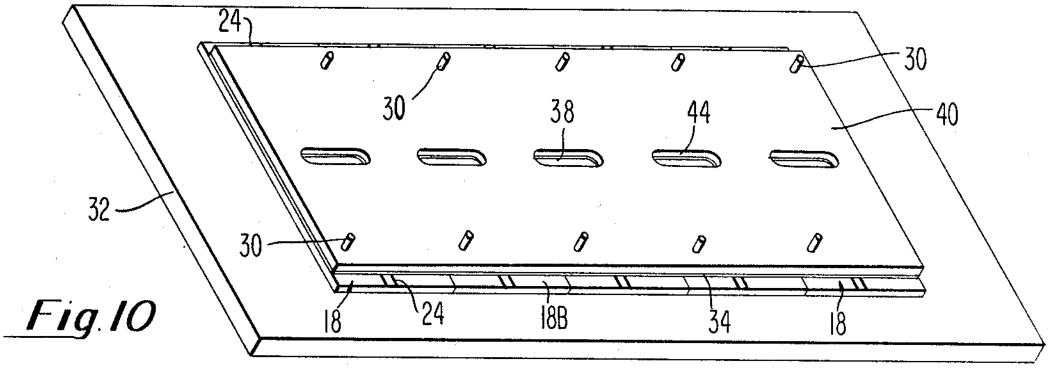
FIGURE 10 is an isometric view showing the arrangement of the parts of FIGURE 9 in an assembled condition.
Figure 11:
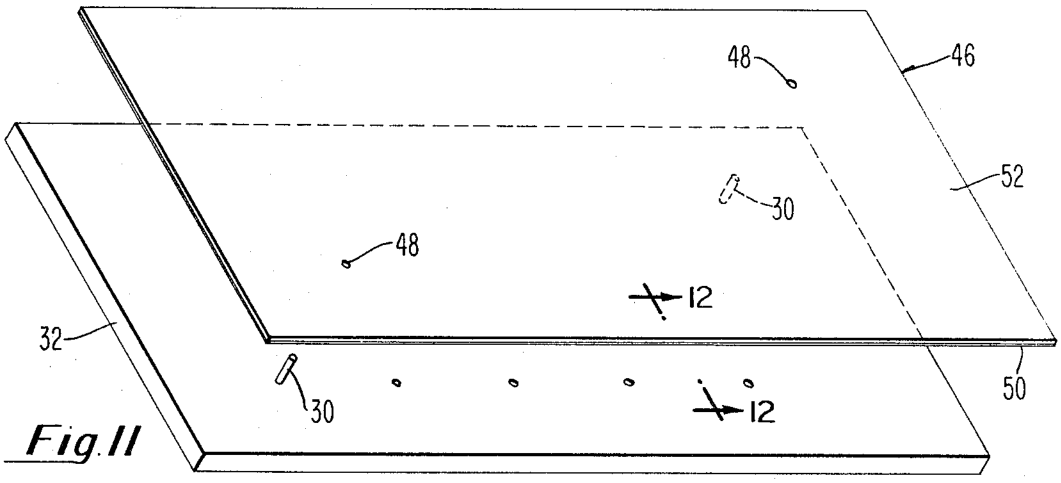
FIGURE 11 is an isometric view illustrating the fixture with a sheet of prepunched copper clad dielectric membrane arranged thereover.
Figure 13:
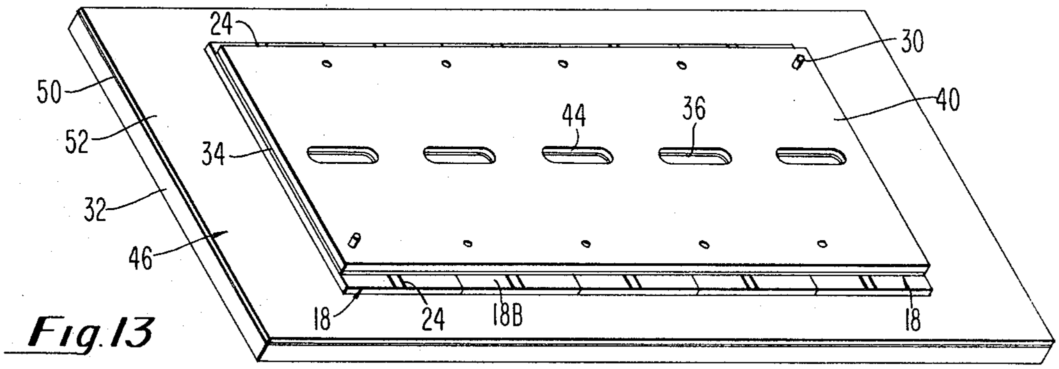
FIGURE 13 shows the stack-up of FIGURE 11 overlayed on the dielectric sheet of FIGURE 11.
Figure 12:
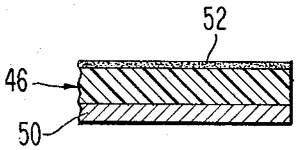
FIGURE 12 is a sectional view along the lines 12—12 of FIGURE 11.
Figure 14:
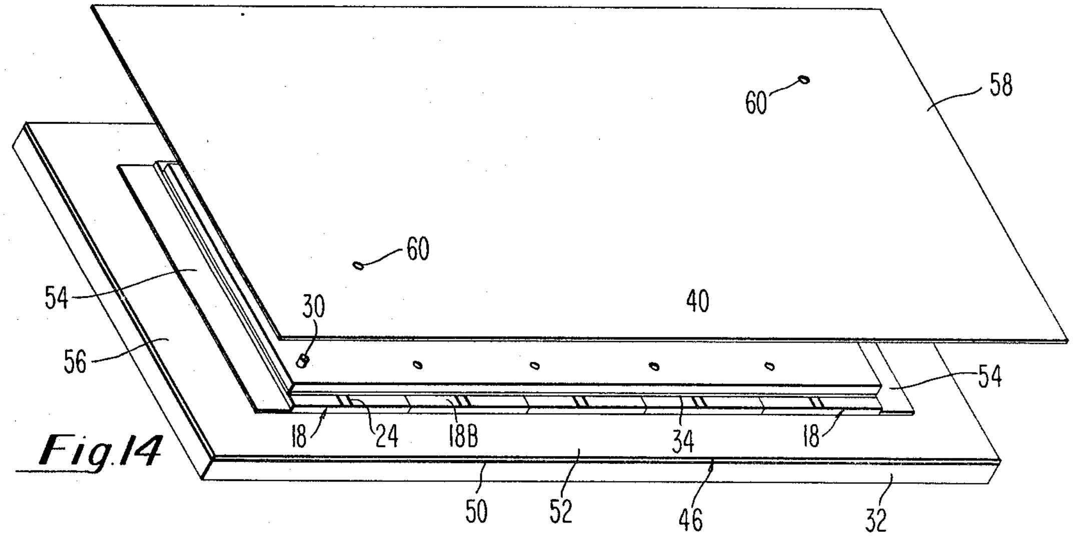
FIGURE 14 is an isometric view showing the stack-up in accordance with the foregoing steps and with an additional dielectric sheet disposed thereover.

Referring next to FIGURE 11, after first removing the above described sub-assembly of FIG. 10 from the jig 32, it is seen that a sheet 46 of copper clad dielectric such for example, as "Mylar" (manufactured by the du Pont Corp. of Wilmington, Del.) of similar dimensions to that of the jig 32, and provided with dowel registration holes 48 therein, is placed, copper side 50 down, adhesive side 52 up, upon jig 32. The prefabricated sub-assembly (FIGURE 10) is then overlaid upon the tacky adhesive side of the copper clad sheet 46 as in FIG. 13. A strip of "Teflon" adhesive 54 is next bonded over the opposite parallel edges of this sub-assembly, FIG. 14, leaving a border 56 of dielectric material around the edge portion of the entire sub-assembly as shown.

Since an etching step is forthcoming in the procedure hereinafter described, it becomes necessary to protect the already etched information-bit-sense-conductors 20–22 from the etchant material. To this end, as seen particularly in FIG. 14, a sheet of e.g. unclad adhesive coated dielectric "Mylar" 58, large enough to span the entire surface of the jig 32, and provided with alignment apertures 60 therein is registered over dowels 30 and adhered thereto under slight pressure. Thereafter, the entire "Mylar" protected sub-assembly is removed from the jig 32 and placed between the platens 62 and 64 of a press 66, FIG. 15, after which the platens are closed. Heat and pressure is then applied so as to bond the various layers into a unitary assembly (inverted) as seen particularly in the view of FIG. 16.

Figure 15:
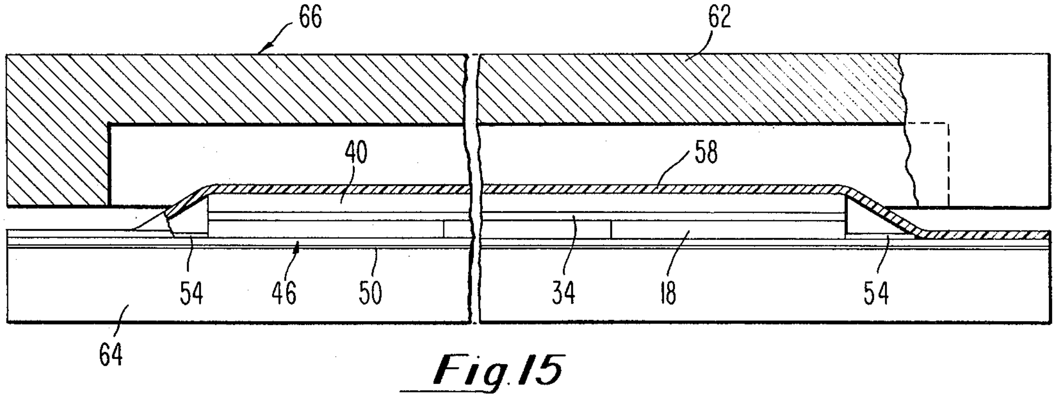
FIGURE 15 is a partial sectional view of the apparatus of FIGURE 14 disposed within a press so as to apply pressure whereby to seal the copper clad dielectric sheet to the plain dielectric sheet in preparation for etching of the copper clad sheet.

It should be clear from the foregoing that the bonding step as shown in FIG. 15 provides an edge seal around the entire sub-assembly thereby forming an air and liquid tight container or bag leaving only the copper clad face 50 exposed. The assembly is thereafter provided with a word line conductor pattern as by silk screening or other similar photo-etch technique after which the entire sub-assembly is placed in an etching bath. This latter operation results in the formation of word lines 68 as seen in FIG. 16, orthogonally disposed relative to the sense-information-bit lines which are shown in dashed outline in this figure.

The sub-assembly is next cut along the horizontal and vertical interrupted lines 70 and 72 so as to remove the excess, unwanted material from the sub-assembly. This step results in the sub-assembly shown in FIG. 17 wherein the word line supporting "Mylar" is illustrated in full without the orthogonally disposed sense information and bit lines being shown. The upper protective "Mylar" sheet 58 and the Teflon strips are next removed from the sub-assembly, and the entire sub-assembly is inverted to the position shown in FIG. 18.

Figure 19:
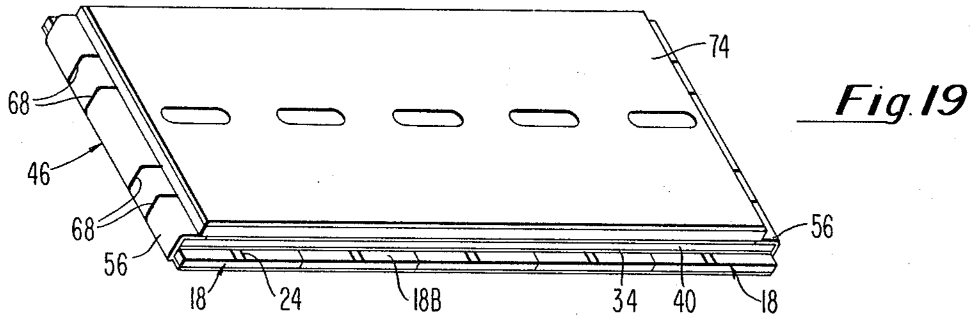
FIGURE 19 illustrates the assembly of FIGURE 18 with the rigid backing board disposed thereon.

The ends of the copper clad sheet 50 carrying the word lines 68 is next folded back upon itself, so as to lie flush with the intermediate backing board 40 after which it is sealed to the backing board. This step provides access means for the word lines when it is necessary to attach conductors thereto extending away therefrom. Thereafter, as seen in FIG. 19, the main backing board 74 is secured to the assembly as by an adhesive, such for example, as the adhesive earlier mentioned herein. This relatively heavy backing board 74 which is applied over the "turned around" ends of the copper clad dielectric forms a supporting structure for the assembly comprising one half of the total thin film magnetic memory.

Figure 16:
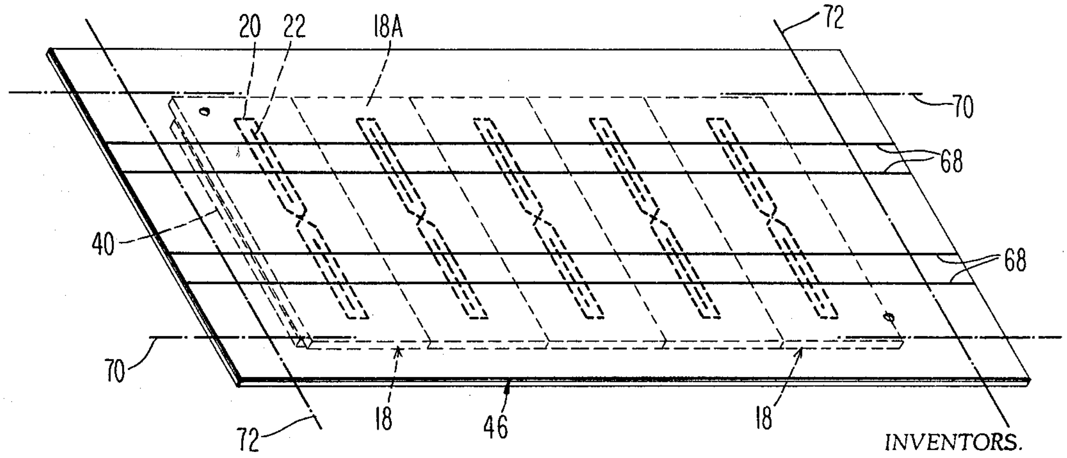
FIGURE 16 is an isometric view of the assembly of FIGURE 15 removed from the press and inverted bottom side up.
Figure 17:
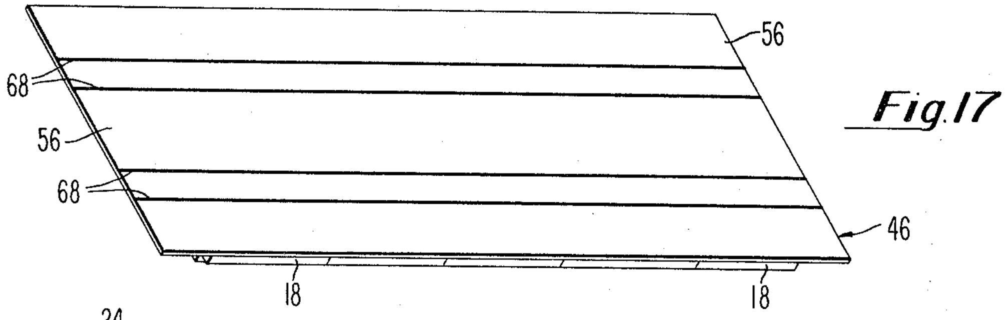
FIGURE 17 is an isometric view of the assembly of FIGURE 16 showing the word lines thereon after suitable etching.
Figure 18:
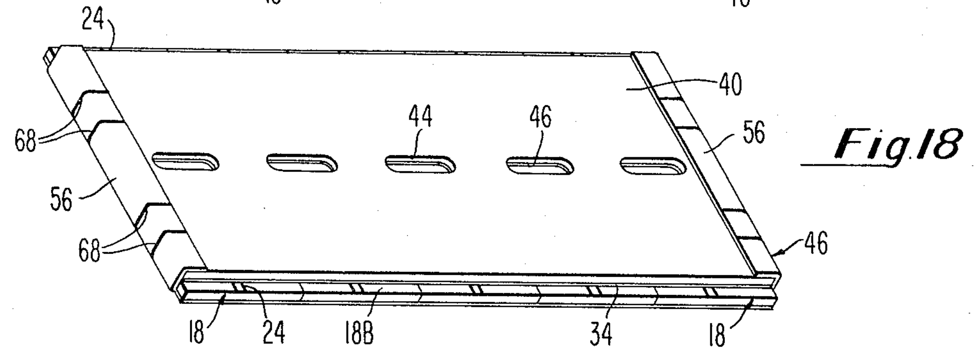
FIGURE 18 illustrates the assembly of FIGURE 17 with the ends of the word lines folded over.

A known undersirable characteristic of the copper clad dielectric (Mylar) is the attendant shrinkage resulting from etching the copper to form multitudinous conductors oriented in parallel, spaced apart arangement as in FIGS. 16 and 17. This shinkage is generally thought to be due to the internal stresses in the dielectric due to the copper overlay or lamination. This generally makes the material unstable, requiring suitable compensating techniques to offset the shrinkage and tolerance build up.

However, a feature of the present invention is the method of utilizing the copper clad dielectric material effectively prestressed when the copper overlay is bonded thereto in a manner so as to avoid the problems of shrinkage. This is accomplished by bonding the dielectric 46 to the rigid glass epoxy assembly five PC boards 18 before it is etched. With this technique, the stresses which ordinarily would be relieved by the etching step are not effective to cause shrinkage. Thus there is no variation in the spacing of the word line conductors 68 and thus no need to compensate therefor.

Figure 5:
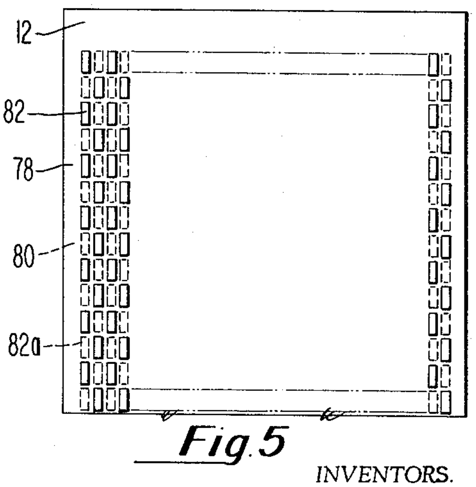
FIGURE 5 is a plan view of the checker-board thin film substrate used with the present invention.
Figure 6:
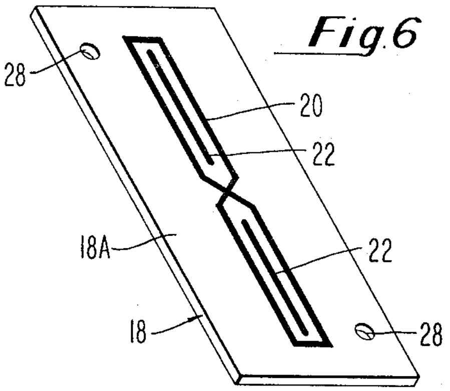
FIGURES 6 and 7 are obverse and reverse idealized diagrammatic views of the information and bit line printed circuit boards for the present invention.
Figure 7:
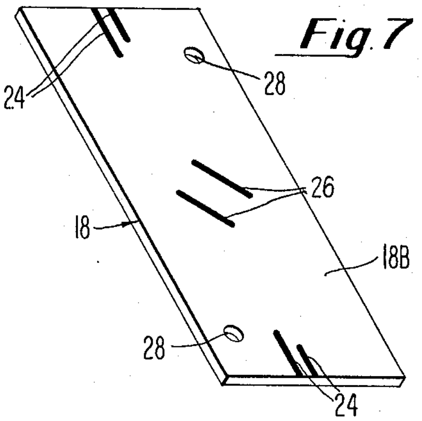
Figure 20:
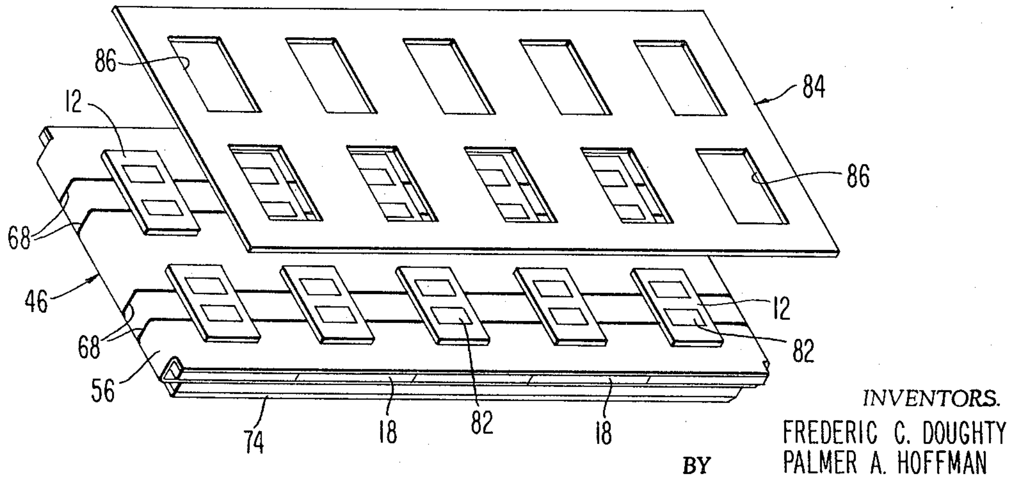
FIGURE 20 is an isometric view illustrating the assembly of FIGURE 18 with the thin film substrate holders disposed on the associated word lines and spacing mask ready for attachment thereto.

The sub-assembly thus formed is next reinverted to place the word lines 68 facing upwardly, FIG. 20. Thereafter, twenty substrates 12, FIGURE 5 bearing on their obverse and reverse (front and back surfaces 78 and 80), rows and columns of thin film deposits 82 and 82A arranged in side by side spaced apart parallel arrangement as shown in FIGS. 5 and 20 with the longer dimension of the thin film bits 82, 82A parallel, FIG. 20 to the word lines 68 with which they are associated. A spacer masking frame 84 e.g. glass epoxy sheet approximately 0.009" thick having a plurality of apertures 86 therein e.g. 10 in the present instance since the apertures are arranged to surround adjacent pairs of substrates 12, is disposed over the associated substrates 12 in contact with the exposed surface of the dielectric carrying the word lines 68. An adhesive is used e.g. "Silastic" in the assembly of FIG. 20 permitting the glass substrates to lie flat on the word lines with which they are associated. The adhesive never actually hardens but tends to float the substrates in a manner of speaking. Thus, if the glass expands or contracts such expansion will not stress the glass since the adhesive tends to "give a little."

Figure 21:
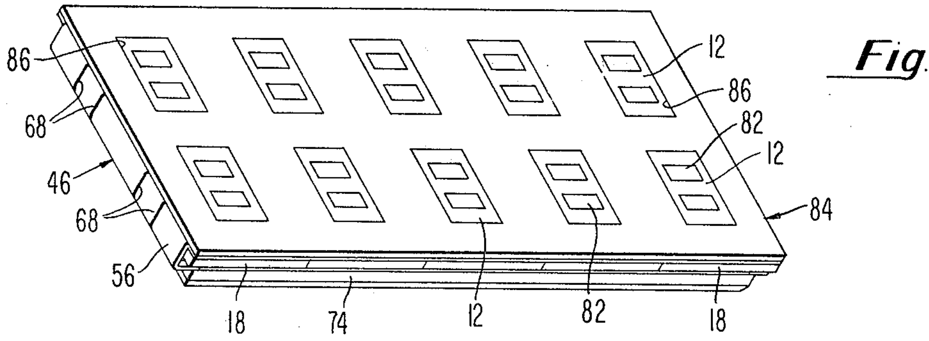
FIGURE 21 is an isometric view of a completed one half of the thin film memory plane assembly of the invention.

The adhesive together with the picture frame type of spacer 84 serves to separate the two half assemblies while leaving room for the glass so that the glass is not actually under any strain when the two halves are bonded together as will be described hereinafter. Obviously, not all of the magnetizable bits are illustrated in FIGS. 20 and 21 since to do so would only clutter up and confuse the drawing. It is to be understood that the actual substrate is substantially similar to the substrate 12 shown more particularly in FIG. 5. The substrate illustrated in FIG. 4 constitutes another variation of magnetizable bit arrangement, and of course, could be used with the present fabrication technique. However, the assembly of FIG. 5 is the preferred embodiment and is the one to which the present application is particularly directed. With the completion of the steps shown in FIGURE 20 forming the embodiment of FIG. 21, as hereinabove mentioned, one half of the entire thin film memory plane assembly has been completed.

Figure 22:
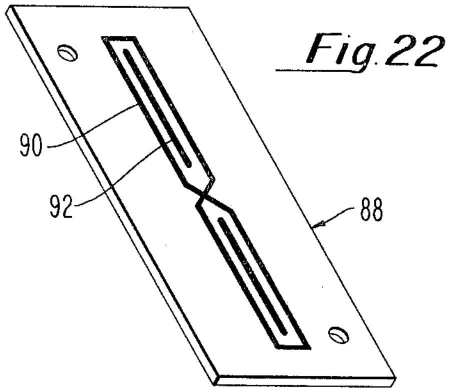
FIGURES 22 and 23 illustrate printed wiring panels similar to printed wiring panels of FIGURES 6 and 7 for use in fabricating the second half of the memory plane structure embodying the invention.
Figure 23:
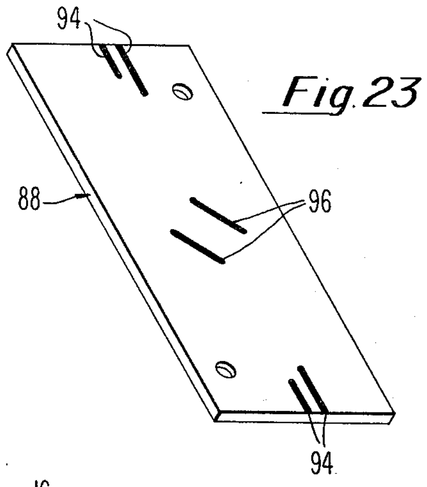

The steps illustrated in FIGS. 2 through 20 are next once again repeated and an additional set of glass epoxy boards 88 carrying sense and information bit conductors 90 and 92, FIG. 22 are provided on one side thereof, while the opposite side of the PC board is provided with terminal conductors 94 and center through hole conductors 96 as seen in FIG. 23.

Figure 24:
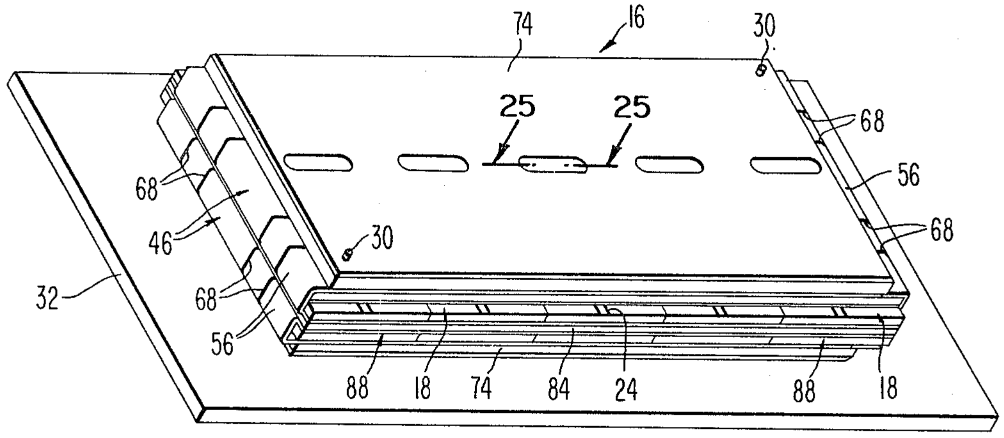
FIGURE 24 is an isometric view of the entire thin film memory plane assembly of the present invention.

The second half of the sub-assembly of the thin film memory plane assembly is thereafter completed in the manner set forth in the previous steps and is illustrated in the associated figures of the drawings, to produce the complete assembly as shown more particularly in FIG. 24, wherein the two half assemblies of FIG. 21 are disposed in the jig 32 with the dowels 30 in registration through oppositely arranged alignment holes so that the two halves may be bonded together through the medium of adhesives, heat and pressure.

Figure 3:
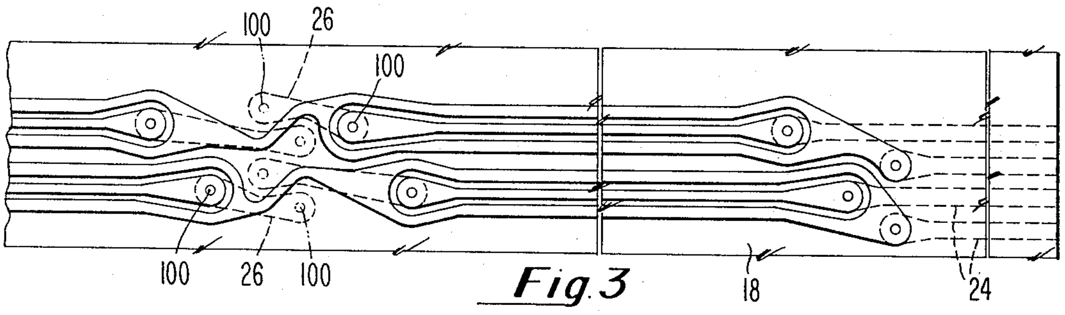
FIGURE 3 is an enlarged detail view of cross connector portions of the device of FIGURE 2.
Figure 4:
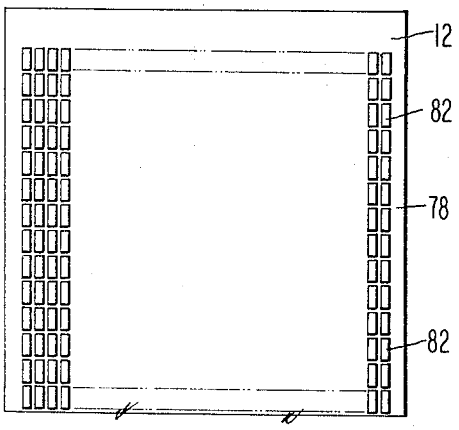
FIGURE 4 is a plan view of a more or less conventional thin film substrate illustrating the organization of thin film bits thereon.
Figure 25:
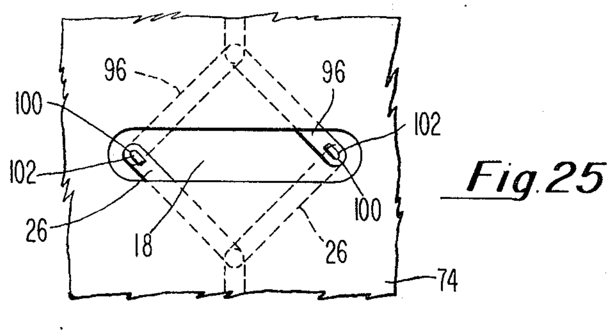
FIGURE 25 is a detail view taken along the line 25—25 of FIGURE 24.
Figures 26, 27:
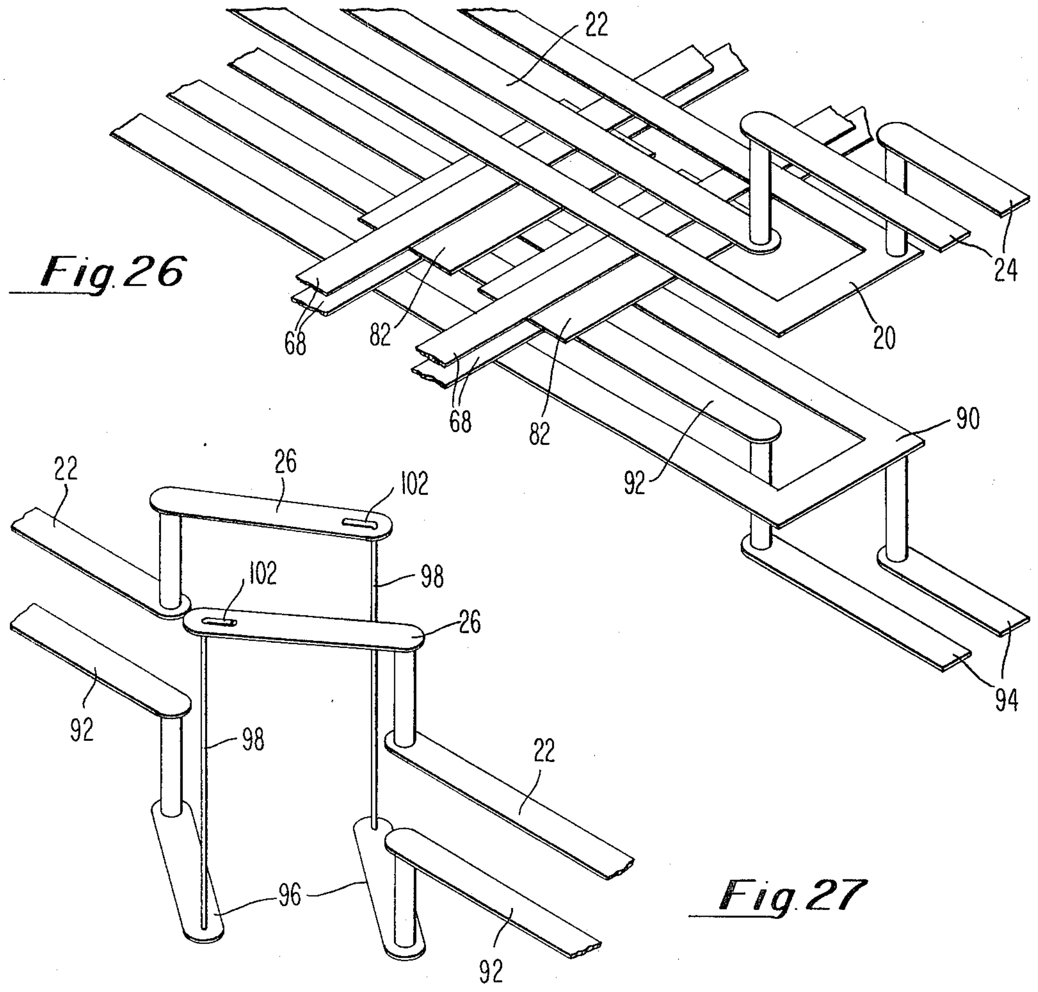
FIGURES 26 and 27 are detail views of portions of the information and bit line interconnecting and the through-lines connecting one plane with the opposite side of such plane; and, FIGURE 28 is a partial end view of the completed structure of FIGURE 1 with portions broken away.
Figure 28:
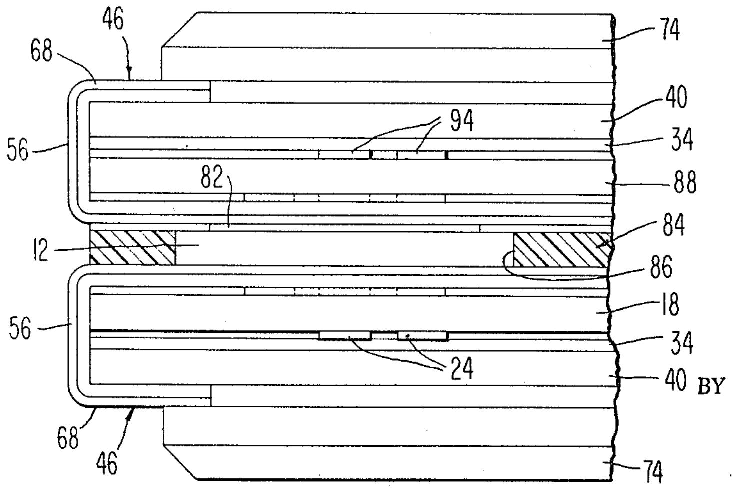

As seen, more particularly, in FIGS. 25, 26, and 27, the five center apertures provide access means for the cross over connections where the sense lines cross from one side to the other for noise cancellation, as seen particularly in FIG. 3. The cross over conductors which are or may be metallic wires 98, FIG. 27 are fed through openings 100 provided therefore after which the ends 102 are bent at right angles, as seen, after which the wires may be soldered or welded to the cross over conductors. Thus any noise picked upon one side by the upper conductor will be cancelled on the other side since the two halves and the circuitry associated therewith are identical. Thereafter, the assembly shown in FIG. 24 is introduced into the frame 14 which includes the supporting structures 104 and interconnecting assemblies 106, 108, 110 for introducing and removing information from the unit as well as the transformers, noise cancellation devices and baluns for noise cancellation which are disposed in operative arrangement therewith.

The foregoing arrangement of magnetizable bits in a checker-board pattern has a number of advantages. One of the more important of these is the fact that there is less "transverse disturb." For example, if it is desired to write in a given word line and then write in an adjacent word line, there is a tendency to disturb the originally written information. By utilizing the so-called checker-board effect, wherein the different alternate bits are on different sides of the substrate support, there is an actual increase in spacing between the bits without making the entire structure larger or the bits much smaller. For example, with the total of 768 magnetizable bits, 384 of them are disposed on one side and the other 384 on the opposite side of the supporting substrate. Thus the same total number of bits is involved. The use of the dielectric word line supporting overlay tends to put the word lines 68 in contact with the magnetizable bit material, which means that the word lines are as close as possible to the magnetizable material which they are to affect.

It becomes immediately apparent that a number of advantages can be gained from the foregoing arrangement. For example, the number of bits per square inch can be doubled thereby reducing by two to one the memory stack size. The number of bits per inch along the sense line can be doubled, thereby increasing the ultimate speed of the resulting memory plane formed thereby and reducing the cost per bit.

Impedance of the word line conductor strip line is lower over known techniques, as a result of the "Mylar" overlay spacing, from e.g. 165 ohms to 100 ohms, and the required driving current is thereby reduced from approximately 600 milliamps to approximately 330 milliamps for the same field exerted on the thin film bit. The E.M.F. required across the word line conductors is reduced, giving a reduction in common mode capacitive noise coupled to the sense system. Approximately twice as many bits can be accommodated by each sense bit connector. This arrangement reduces by half the number of sense bit connectors, sense bit "endarounds" and sense bit transformers.

What is claimed is:

1. The method of fabricating thin film memory plane apparatus comprising the steps of:

(a) providing an electrically insulating member with a plurality of electrical conductors disposed thereon in spaced apart, parallel relation including conductive means operably associated with each of said electrical conductors thereon for connecting the same to a source of signal potential, (b) securing a copper clad dielectric member to said first mentioned member with the copper clad portion of the former exposed and in a manner such that the dielectric portion thereof is effectively immobilized relative to the first mentioned member thereby avoiding any shrinkage of the dielectric material when the copper is subsequently etched away therefrom, (c) selectively etching only said copper clad member thereby to provide a plurality of electrical conductors thereon oriented at right angles to the conductors of said first electrically insulating member, (d) securing an electrically insulating substrate bearing a pattern of magnetizable bits thereon effectively interleaved from obverse to reverse sides thereof in contact with the conductors of said copper clad dielectric member, and (e) attaching an electrically insulating member carrying a plurality of electrical conductors to said substrate with the conductors thereof disposed in parallel relation relative to the conductors of said first mentioned insulating member and interconnecting the first mentioned conductors with the last mentioned conductors providing a memory plane of the foregoing elements.

2. The method of fabricating thin film memory plane apparatus comprising the steps of:

(a) providing an electrically insulating member with a plurality of electrical conductors disposed thereon in spaced apart, parallel relation including conductive means operably associated with each of said electrical conductors thereon for connecting the same to a source of signal potential, (b) securing a copper clad dielectric member to said first mentioned member with the copper clad portion of the former exposed and in a manner such that the dielectric portion thereof is effectively immobilized relative to the first mentioned member thereby avoiding any shrinkage of the dielectric material when the copper is subsequently etched away therefrom, (c) providing etch resistant means for said electrically insulating member, (d) selectively etching said copper clad member thereby to provide a plurality of electrical conductors thereon oriented at right angles to the conductors of said first electrically insulating member, (e) securing an electrically insulating substrate bearing a pattern of magnetizable bits thereon effectively interleaved from obverse to reverse sides thereof in contact with the conductors of said copper clad dielectric member, and (f) attaching an electrically insulating member carrying a plurality of electrical conductors to said substrate with the conductors thereof disposed in parallel relation relative to the conductors of said first mentioned insulating member and interconnecting the first mentioned conductors with the last mentioned conductors providing a memory plane of the foregoing elements.

3. The method of fabricating thin film memory plane apparatus comprising the steps of:

(a) providing a plurality of electrically insulating members with electrical conductors disposed thereon in spaced apart parallel rows relation and including connecting terminals operably associated with each of said electrical conductors thereon for connecting the same to a source of signal potential, (b) securing a copper clad dielectric member to said first mentioned members with the copper clad portion of the former exposed and in a manner such that the dielectric portion thereof is effectively immobilized relative to the first mentioned members thereby avoiding any shrinkage of the dielectric material when the copper is subsequently etched away therefrom, (c) protectively covering said electrical conductors to prevent accidental removal thereof by said subsequent etching, (d) selectively etching said copper clad member thereby to provide a plurality of word line conductors thereon oriented at right angles to the conductors of said first mentioned members, (e) securing a plurality of electrically insulating substrates each bearing a pattern of magnetizable bits thereon effectively interleaved from obverse to reverse sides thereof in contact with the conductors of said copper clad dielectric member, (f) attaching a plurality of electrically insulating members carrying a plurality of electrical conductors to said substrates with the conductors thereof disposed in parallel relation relative to the conductors of said first mentioned dielectric member and interconnecting the same effectively thereby providing a memory plane of the foregoing elements, and (g) mounting said assembly in a supporting frame.

4. The method of fabricating thin film memory plane apparatus comprising the steps of:

(a) providing a plurality of electrically insulating members with electrical conductors disposed thereon in spaced apart parallel rows relation and including connecting terminals operably associated with each of said electrical conductors thereon for connecting the same to a source of signal potential, (b) securing a copper clad dielectric member to said first mentioned members with the copper clad portion of the former exposed and in a manner such that the dielectric portion thereof is effectively immobilized relative to the first mentioned members thereby avoiding any shrinkage of the dielectric material when the copper is subsequently etched away therefrom, (c) applying a sheet of dielectric material to said electrically insulating members effectively protectively covering said electrical conductors to prevent accidental removal thereof by said subsequent etching, (d) selectively etching said copper clad member thereby to provide a plurality of word line conductors thereon oriented at right angles to the conductors of said first mentioned members, (e) securing a plurality of electrically insulating substrates each bearing a pattern of magnetizable bits thereon effectively interleaved from obverse to reverse sides thereof in contact with the conductors of said copper clad dielectric member, (f) attaching a plurality of electrically insulating members carrying a plurality of electrical conductors to said substrates with the conductors thereof disposed in parallel relation relative to the conductors of said first mentioned dielectric member and interconnecting the same effectively thereby providing a memory plane of the foregoing elements, and (g) mounting said assembly in a supporting frame.

5. The method of fabricating thin film memory plane apparatus comprising the steps of:

(a) providing a plurality of dielectric members with a plurality of electrical conductors disposed thereon in spaced apart parallel relation and including connecting terminals operably associated with each of said electrical conductors thereon for connecting the same to a source of electrical signal potential, (b) securing a copper clad dielectric member to said first mentioned dielectric member with the copper portion of the former exposed and in a manner such that the dielectric portion thereof is effectively immobilized relative to the first mentioned dielectric member thereby avoiding any shrinkage of the dielectric material when the copper is subsequently etched away therefrom, (c) providing a protective etch resistant cover for said dielectric members leaving only said copper clad portions of said copper clad member exposed, (d) selectively etching said copper clad member thereby to provide a plurality of electrical conductors thereon oriented at right angles to the conductors of said first mentioned dielectric member, (e) securing a plurality of electrically insulating substrates each bearing a pattern of magnetizable bits thereon effectively interleaved from obverse to reverse sides thereof in contact with the conductors of said copper clad dielectric member and with the conductors of said copper clad member extending parallel to the long dimension of said bits, (f) securing a spacing mask to the foregoing assembly providing thereby a regular planar exposed surface, (g) attaching a plurality of electrically insulating members carrying a plurality of electrical conductors to said spacing mask with the conductors thereof disposed in parallel relation relative to the conductors of said first mentioned dielectric member and electrically connected thereto thereby providing a memory plane of the foregoing elements, and (h) mounting said assembly in a supporting frame.

6. The method of frabricating thin film memory plane apparatus comprising the steps of:

(a) providing a plurality of dielectric members with a plurality of electrical conductors disposed thereon in spaced apart parallel relation and including connecting terminals operably associated with each of said electrical conductors thereon for connecting the same to a source of electrical signal potential, (b) securing a copper clad dielectric member to said first mentioned dielectric member with the copper portion of the former exposed and in a manner such that the dielectric portion thereof is effectively immobilized relative to the first mentioned dielectric member thereby avoiding any shrinkage of the dielectric material when the copper is subsequently etched away therefrom, (c) providing a protective cover for said dielectric member leaving only said copper clad portion of said member exposed, (d) selectively etching said copper clad member thereby to provide a plurality of electrical conductors thereon oriented at right angles to the conductors of said first mentioned dielectric member, (e) securing a plurality of electrically insulating substrates each bearing a pattern of magnetizable bits thereon effectively interleaved from obverse to reverse sides thereof in contact with the conductors of said copper clad dielectric member and with the conductors of said copper clad member extending parallel to the long dimension of said bits, (f) securing a spacing mask to the foregoing assembly providing thereby a regular planar exposed surface, (g) attaching a plurality of electrically insulating members carrying a plurality of electrical conductors to said spacing mask with the conductors thereof disposed in parallel relation relative to the conductors of said first mentioned dielectric member and electrically connected thereto thereby providing a memory plane of the foregoing elements, and (h) mounting said assembly in a demountable supporting, pluggable frame.

7. The method of fabricating thin film memory plane apparatus comprising the steps of:

(a) providing a plurality of upper dielectric members with a plurality of electrical conductors disposed thereon in spaced apart parallel relation and including connecting terminals operably associated with each of said electrical conductors for connection to a source of signal potential, (b) securing a copper clad dielectric member to said upper dielectric members with the copper portion of the former exposed and in a manner such that the dielectric portion thereof is completely immobilized relative to the upper dielectric member thereby avoiding any shrinkage of the dielectric material when the copper is subsequently etched away therefrom, (c) effectively sealing the electrical conductors of the upper dielectric members from the atmosphere avoiding removal thereof by etching, (d) selectively etching only said copper clad member thereby providing a plurality of electrical conductors thereon oriented at right angles to the conductors of said first mentioned dielectric member, (e) securing a plurality of electrically insulating substrates each one of which has a pattern of magnetizable bits effectively interleaved from obverse to reverse sides thereof in contact with the conductors of said copper clad dielectric member, (f) attaching a plurality of lower electrically insulating members each carrying a plurality of electrical conductors to said substrates with the conductors thereof disposed in parallel relation relative to the conductors of said first mentioned dielectric member and electrically intercoupling the upper and lower conductors, thereby providing a first unitary rigid assembly of the foregoing elements, (g) securing a second unitary assembly similar to said first unitary assembly thereby forming a rigid magnetic thin film memory plane, and (h) mounting said assembly in a demountable, pluggable mounting frame.

8. Thin film memory plane apparatus comprising, (a) electrically insulating means having a plurality of parallel spaced, conductors thereon, said conductors extending from end to end of said insulating means and including attachment means at opposite ends thereof, for electrical interconnection to a source of electrical signal potential, (b) prestressed copper clad dielectric material having rows of parallel spaced conductors thereon bonded to said electrically insulating means effective to avoid any deformation of the planar geometry and spacing of the local conductors thereon, (c) an electrically insulating substrate provided with a pattern of magnetizable thin film bits on obverse and reverse surfaces thereof with the bits effectively interleaved relative to one another, said copper clad means being arranged relative to said substrate so as to overlie the same with the conductors of the copper clad means in contact with the magnetizable bits and oriented at right angles to the conductors of said electrically insulating means, (d) electrically insulating means having a plurality of spaced conductors thereon secured to said substrates, with said last named conductors extending from end to end of said insulating means and including attachment means for electrical connection to the conductors of said first mentioned electrically insulating means and to other associated electrical circuitry, the conductors of said last mentioned insulating means being parallel to the first mentioned conductors and spaced therefrom, and (e) means mounting the foregoing apparatus as a unitary assembly in a demountable, pluggable supporting frame.

9. Thin film memory plane apparatus comprising, (a) one or more electrically insulating means having a plurality of parallel, spaced conductors thereon, said conductors extending from end to end of said insulating means and including attachment means at ends thereof, for electrical interconnection to a source of electrical signal potential, (b) prestressed copper clad dielectric material having rows of parallel spaced conductors thereon bonded to said electrically insulating means effective to avoid any deformation of the planar geometry and spacing of the local conductors thereon.

(c) one or more electrically insulating substrates provided with a pattern of magnetizable thin film bits on obverse and reverse surfaces thereof with the bits effectively interleaved relative to one another, said copper clad means being arranged relative to said substrates so as to overlie the same with the conductors of the copper clad means in contact with the magnetizable bits and oriented at right angles to the conductors of said electrically insulating means, (d) one or more electrically insulating means having a plurality of spaced conductors thereon, secured to said substrates with said last named conductors thereon, extending from end to end of said insulating means and including attachment means for electrical connection to the conductors of said first mentioned electrically insulating means and to other associated electrical circuitry, the conductors of said last mentioned insulating means being parallel to the first mentioned conductors and spaced therefrom, and (e) means mounting the foregoing apparatus as a unitary assembly in a demountable, pluggable supporting frame.

10. Thin film memory plane apparatus comprising, (a) a plurality of electrically insulating printed circuit boards having a plurality of parallel, spaced, conductors thereon, said conductors extending from end to end of said boards and including attachment means at opposite ends thereof, for electrical interconnection to a source of electrical signal potential, (b) a sheet of prestressed copper clad dielectric material having rows of parallel spaced conductors thereon bonded to said printed circuit boards effective to avoid shrinkage of the planar geometry and spacing of the local conductors thereon, (c) a plurality of electrically insulating substrates each being provided with a pattern of magnetizable thin film bits on obverse and reverse surfaces thereof with the bits effectively interleaved relative to one another, said copper clad means being arranged relative to said substrates so as to overlie the same with the conductors of the copper clad means in contact with the magnetizable bits and oriented at right angles to the conductors of said printed circuit boards and parallel to the long dimension of said bits, (d) a plurality of electrically insulating printed circuit boards having a plurality of spaced conductors thereon, secured to said substrates with the conductors thereon extending from end to end of said printed circuit boards and including attachment means for electrical connection to the conductors of said first mentioned printed circuit boards and to other associated electrical circuitry, the conductors of said last mentioned printed circuit boards being parallel to the first mentioned conductors and spaced therefrom, and (e) means mounting the foregoing apparatus as a unitary assembly in a demountable, pluggable supporting frame.

11. Thin film memory plane apparatus comprising, (a) electrically insulating means having a plurality of parallel, spaced, conductors thereon, said conductors extending from end to end of said insulating means and including attachment means at opposite ends thereof, for electrical interconnection to a source of electrical signal potential, (b) prestressed copper clad dielectric material having rows of parallel spaced conductors thereon bonded to said electrically insulating means effective to avoid any deformation of the planar geometry and spacing of the local conductors thereon, (c) an electrically insulating substrate provided with a pattern of magnetizable thin film bits on obverse and reverse surfaces thereof with the bits effectively interleaved relative to one another, said copper clad means being arranged relative to said substrate so as to overlie the same with the conductors of the copper clad means in contact with the magnetizable bits and oriented at right angles to the conductors of said electrically insulating means, (d) spacing, masking means effectively surrounding said substrate effective to form a flat planar surface for receiving the next adjacent insulating means, (e) electrically insulating means having a plurality of spaced conductors thereon secured to said substrates, with said last named conductors extending from end to end of said insulating means and including attachment means for electrical connection to the conductors of said first mentioned electrically insulating means and to other associated electrical circuitry, the conductors of said last mentioned insulating means being parallel to the first mentioned conductors and spaced therefrom, and (f) means mounting the foregoing apparatus as a unitary assembly in a demountable, pluggable supporting frame.

12. Thin film memory plane apparatus, comprising:

(a) electrically insulating means having a plurality of parallel, spaced, conductors thereon, said conductors extending from end to end of said insulating means and including attachment means at opposite ends thereof, for electrical interconnection to a source of electrical signal potential, (b) prestressed copper clad dielectric material having rows of parallel spaced conductors thereon bonded to said electrically insulating means effective to avoid any deformation of the planar geometry and spacing of the local conductors thereon, (c) an electrically insulating substrate provided with a pattern of magnetizable thin film bits on obverse and reverse surfaces thereof with the bits effectively interleaved relative to one another, said copper clad means being arranged relative to said substrate so as to overlie the same with the conductors of the copper clad means in contact with the magnetizable bits and oriented at right angles to the conductors of said electrically insulating means, (d) an electrically insulating apertured spacer mask, surrounding said substrate and bonded to said electrically insulating means, (e) electrically insulating means having a plurality of spaced conductors thereon secured to said spacer mask, with said last named conductors extending from end to end of said insulating means and including attachment means for electrical connection to the conductors of said first mentioned electrically insulating means and to other associated electrical circuitry, the conductors of said last mentioned insulating means being parallel to the first mentioned conductors and spaced therefrom, and (f) means mounting the foregoing apparatus as a unitary assembly in a demountable, pluggable supporting frame, 13. Thin film memory plane apparatus comprising, (a) a plurality of electrically insulating printed circuit boards having a plurality of parallel, spaced, conductors thereon, said conductors extending from end to end of said boards and including attachment means at opposite ends thereof, for electrical interconnection to a source of electrical signal potential, (b) a first sheet of prestressed copper clad dielectric material having rows of parallel spaced conductors thereon bonded to said printed circuit boards effective to avoid shrinkage of the planar geometry thereof and spacing of the local conductors thereon, (c) a plurality of electrically insulating substrates each being provided with a pattern of magnetizable thin film bits on obverse and reverse surfaces thereof with the bits effectively interleaved relative to one another, said copper clad means being arranged relative to said substrates so as to overlie the same with the conductors of the copper clad means in contact with the magnetizable bits and oriented at right angles to the conductors of said printed circuit boards and parallel to the long dimension of said bits, (d) a second sheet of prestressed copper clad dielectric material bonded to said substrate, (e) a plurality of electrically insulating printed circuit boards having a plurality of spaced conductors thereon, secured to said second copper clad sheet with the conductors theron extending from end to end of said printed circuit boards and including attachment means for electrical connection to the conductors of said first mentioned printed circuit boards and to other associated electrical circuitry, the conductors of said last mentioned printed circuit boards being parallel to the first mentioned conductors and spaced therefrom, and (f) means mounting the foregoing apparatus as a unitary assembly in a demountable, pluggable supporting frame.

14. Thin film memory plane apparatus comprising, (a) a plurality of electrically insulating printed circuit boards having a plurality of parallel, spaced conductors thereon, said conductors extending from end to end of said board and including attachment means at opposite ends thereof, for electrical interconnection to a source of electrical signal potential, (b) a sheet of prestressed copper clad dielectric material having rows of parallel spaced conductors thereon bonded to said printed circuit boards effective to avoid shrinkage of the planar geometry and spacing of the local conductors thereon, (c) a plurality of electrically insulating substrates each being provided with a pattern of magnetizable thin film bits on obverse and reverse surfaces thereof with the bits effectively interleaved relative to one another, said copper clad means being arranged relative to said substrates so as to overlie the same with the conductors of the copper clad means in contact with the magnetizable bits and oriented at right angles to the conductors of said printed circuit boards and parallel to the long dimension of said bits, the opposite ends of said copper clad member being folded back upon the main body of said upper clad member to expose the ends of the conductors providing external attachment means, (d) a plurality of electrically insulating printed circuit boards having a plurality of spaced conductors thereon, secured to said substrates with the conductors thereon, secured to said substrates and extending from end to end of said printed circuit boards and including attachment means for electrical connection to the conductors of said first mentioned printed circuit boards and to other associated electrical circuitry, the conductors of said last mentioned printed circuit boards being parallel to the first mentioned conductors and spaced therefrom, and (e) means mounting the foregoing apparatus as a unitary assembly in a demountable, pluggable supporting frame.

No references cited.

BERNARD KONICK, *Primary Examiner.*

JAMES W. MOFFITT, *Examiner.*